United States Patent
Krauss

(10) Patent No.: US 6,412,759 B1
(45) Date of Patent: Jul. 2, 2002

(54) METHOD FOR CONTROLLING SYSTEM INCLUDING A CONTROLLABLE AIR SPRING AND A CONTROLLABLE SHOCK ABSORBER CONNECTED IN PARALLEL

(75) Inventor: Hans-Peter Krauss, Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/644,713

(22) Filed: Aug. 24, 2000

(30) Foreign Application Priority Data

Aug. 25, 1999 (DE) .......................... 199 40 198

(51) Int. Cl.[7] .................................. F16F 9/04
(52) U.S. Cl. .................... 267/64.23; 267/218; 188/195; 280/5.515; 280/124.161
(58) Field of Search ............... 188/195; 267/218, 267/64.23, DIG. 1, DIG. 2; 280/5.515, 124.158, 124.159, 124.16, 124.161

(56) References Cited

U.S. PATENT DOCUMENTS

| | | | | |
|---|---|---|---|---|
| 3,042,392 A | * | 7/1962 | Schmitz et al. .......... | 267/64.21 |
| 3,372,919 A | * | 3/1968 | Jackson ................... | 267/64.21 |
| 4,325,541 A | * | 4/1982 | Korosladanyi et al. ..... | 267/8 R |
| 4,586,728 A | * | 5/1986 | Tokunaga et al. .......... | 280/707 |
| 4,852,863 A | * | 8/1989 | Breitenbacher et al. ..... | 267/218 |
| 5,234,203 A | * | 8/1993 | Smith ..................... | 267/131 |
| 5,542,638 A | * | 8/1996 | Smith ..................... | 248/421 |
| 5,725,239 A | * | 3/1998 | de Molina ................ | 280/711 |
| 5,765,115 A | | 6/1998 | Ivan | |
| 5,859,692 A | * | 1/1999 | Ross, Jr. et al. ......... | 356/4.01 |

FOREIGN PATENT DOCUMENTS

| | | |
|---|---|---|
| DE | 3442497 | 5/1986 |
| DE | 43 34 007 | 4/1995 |
| EP | 0166702 | 1/1986 |
| EP | 0177790 | 4/1986 |
| EP | 0556055 | 8/1993 |
| EP | 0864452 | 9/1998 |
| JP | 07 167 189 | 7/1995 |

* cited by examiner

Primary Examiner—Paul N. Dickson
Assistant Examiner—Xuan Lan Nguyen
(74) Attorney, Agent, or Firm—Walter Ottesen

(57) ABSTRACT

The invention relates to a system which includes an air spring (2) which, in turn, encloses an air volume (16). The system also includes a controllable shock absorber (4) connected in parallel to the air volume. Furthermore, the system includes an ancillary volume (22) with which the air volume (16) of the air spring (2) is connected via a controllable throttle (20). The stiffness and the total damping of the system can be pregiven via a control of the throttle (20) and of the controllable shock absorber (4) independently of each other.

6 Claims, 2 Drawing Sheets

METHOD FOR CONTROLLING SYSTEM INCLUDING A CONTROLLABLE AIR SPRING AND A CONTROLLABLE SHOCK ABSORBER CONNECTED IN PARALLEL

FIELD OF THE INVENTION

The invention relates to a system including a system for a motor vehicle including an air spring which encloses an air volume and a controllable shock absorber connected in parallel with the air spring. The invention also relates to a method for controlling such a system.

BACKGROUND OF THE INVENTION

German patent publication 4,334,007 discloses a shock absorber spring unit wherein an air spring is connected in parallel with a controllable pneumatic shock absorber. The air spring is mounted above the pneumatic shock absorber and, when the air spring deflects, a piston is moved downwardly or upwardly in a chamber of the pneumatic shock absorber. The end face of the piston contains controllable throttle openings so that air can flow from a first component chamber into a second component chamber of the pneumatic shock absorber when there is an upward or downward movement of the piston. A damping of the shock absorber spring unit comes about because of the flow losses of the air flowing over in the throttle openings.

A large damping operation is performed with the shock absorber spring unit disclosed in German patent publication 4,334,007 and a system can be damped to a sufficient extent because an adequately large air flow is transferred via the throttle openings from one component chamber into the other component chamber when there is a movement of the piston. The shock absorber spring unit, however, does include the disadvantage that not only the damping but also the spring stiffness is influenced by the adjustment of the throttle in the end face of the piston. As a consequence of the above, only one of the two quantities can be pregiven independently of the other and the other quantity then results as a consequence thereof.

This leads to the condition that the spring stiffness of the shock absorber spring unit can be adjusted over a large range but the resulting damping does not correspond to the requirement of the vehicle for each throttle adjustment.

The slightest adjustable spring stiffness results when the throttle is opened entirely and the damping is then equal to zero.

The largest adjustable spring stiffness results for a throttle which is completely closed wherein no air flows over any longer and damping is also equal to zero.

Both conditions do not satisfy the requirements in the vehicle. One condition which does satisfy the requirements includes a throttle adjustment which lies therebetween and is only adjustable within a narrow range.

In summary, it can be stated that, in the shock absorber spring unit disclosed in German patent publication 4,334,007, the magnitude of the damping cannot always be adapted in a suitable manner to the spring stiffness of the entire shock absorber spring unit.

SUMMARY OF THE INVENTION

It is an object of the invention to provide a system which includes an air spring and a controllable shock absorber connected in parallel thereto wherein the damping is adaptable to the spring stiffness. It is also an object of the invention to provide a method for controlling such a system.

The system of the invention includes a system for a motor vehicle. The system includes: an air spring defining an enclosed air volume; a controllable shock absorber connected in parallel with the air spring; a structure defining an ancillary volume; and, a controllable throttle for controlling the passage of fluid between the enclosed air volume and the ancillary volume.

The method of the invention is for controlling a system including a system for a motor vehicle. The system includes an air spring enclosing an air volume and a controllable shock absorber connected in parallel to the air spring. The method includes the steps of: providing an ancillary volume connected to the air volume via a controllable throttle having a throttle resistance which can be varied; presetting a total damping of the system and a spring stiffness of the air spring; adjusting the throttle resistance so that the air spring has the preset stiffness; determining the magnitude of a damping which occurs at the controllable throttle in dependence upon frequency; and, adjusting the controllable shock absorber so that the sum of the damping occurring therein and the damping occurring at the controllable throttle corresponds substantially to the total damping.

Preferably, the total damping is so pregiven that the axle assembly and axle components are adequately damped in the entire frequency range. The frequency range includes at least the inherent frequencies of all components (which are capable of oscillation) of the system which should be damped; that is, especially the inherent frequencies of the assembly and of the axle components.

The advantages achieved with the invention are especially seen in that the total damping and the spring stiffness of the system can be pregiven independently of each other. A further advantage of the invention is that the inherent frequencies of the system can be continuously preset via the adjustment of the magnitude of the spring stiffness and via the adjustment of the damping which is independent thereof. A further advantage of the invention is that the air spring, which is connected to the ancillary volume, contributes to the total damping of the system and therefore the shock absorber has to provide a slighter damping for a preset total damping. The shock absorber can therefore be dimensioned to be smaller and less heat is developed in the shock absorber.

According to another feature of the invention, the ancillary volume is configured so as to be unchanged. The advantage of this embodiment is that an unchanged additional volume is especially easy to configure.

According to a first embodiment of the invention, the air spring and the shock absorber are each mounted alone. According to a second embodiment, the air spring and the shock absorber are mounted in a shock absorber spring unit. This affords the advantage that the system, which includes the air spring and the shock absorber, takes up only little mounting space. Preferably, the air spring is mounted above the shock absorber in this embodiment.

According to still another embodiment of the invention, the air volume of the air spring is connected via a line to the ancillary volume. According to an alternative embodiment of the invention, the air volume of the air spring is connected directly to the ancillary volume. In this case, the air volume of the air spring and the ancillary volume are delimited by a common partition wall in which the controllable throttle is mounted. The advantage of this embodiment is that the air spring and the ancillary volume, which is connected thereto, need only very little mounting space to accommodate the same.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
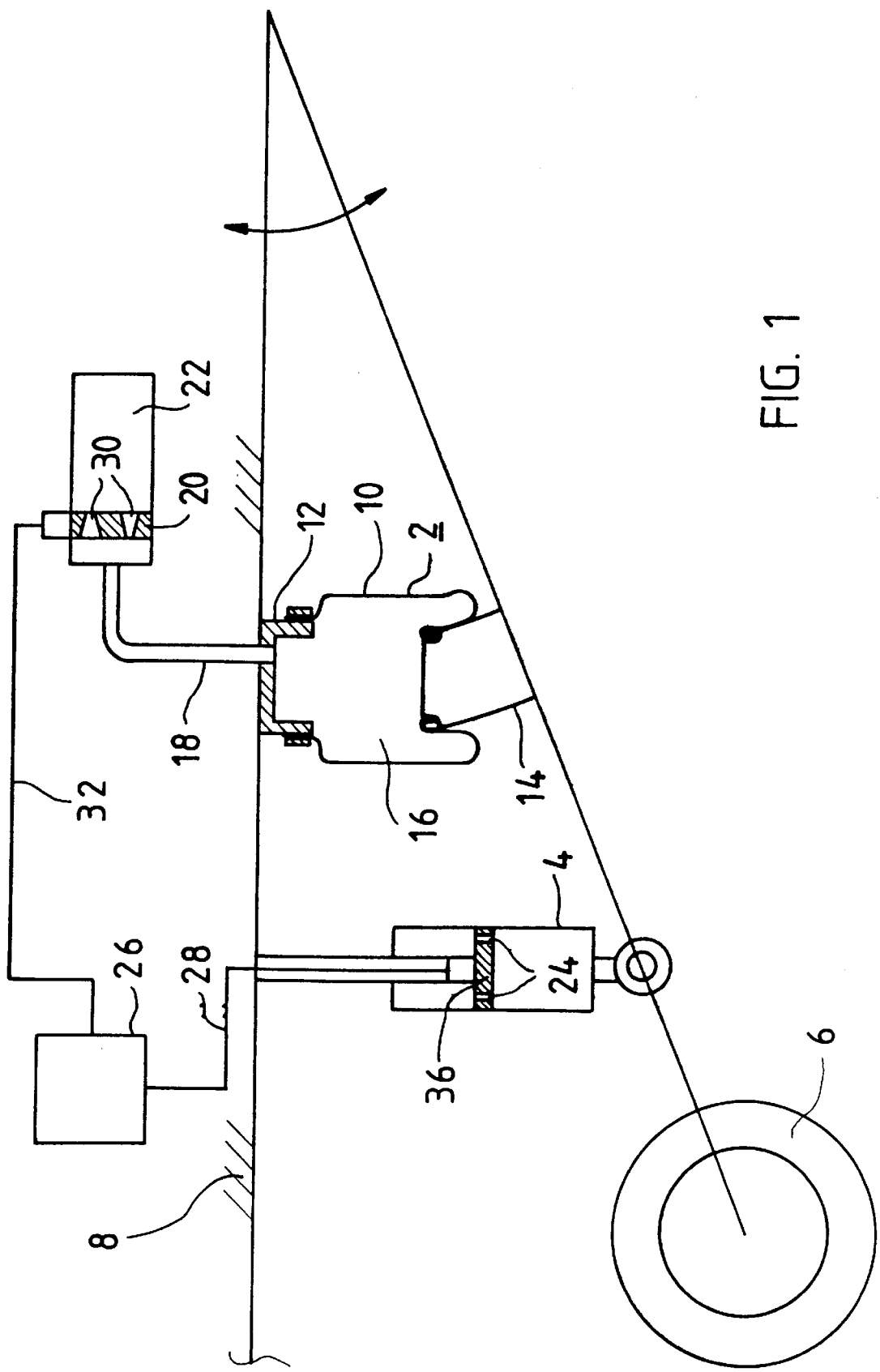
FIG. 1 is a schematic of a vehicle chassis having a system including an air spring and a shock absorber; and, FIG. 2 is a schematic showing a system which includes an air spring and a shock absorber mounted in a shock absorber spring unit.

FIG. 1 is a schematic showing a portion of a motor vehicle having a system which includes an air spring 2 and a controllable shock absorber 4. Only those components are shown which are needed for the explanation of the invention which follows.

The shock absorber 4 shown in the embodiment is a pneumatic shock absorber and is shown by way of example. However, the system can also include other shock absorbers of known types. A vehicle wheel 6 is suspendedly mounted relative to a vehicle chassis 8 of a motor vehicle with the aid of the air spring 2 and the shock absorber 4. The air spring 2 is connected in parallel to the controllable shock absorber 4, that is, for a spring compression movement of the wheel 6, the air spring 2 and the shock absorber 4 are perforce always simultaneously shortened and, in contrast, with a downward movement of the wheel 6, the air spring 2 and the shock absorber 4 are perforce always simultaneously extended. The controllable shock absorber 4 includes controllable throttle openings 24 in a displacement piston 36. A damping medium flows from one component chamber into another component chamber of the shock absorber 4 because of the lengthening or shortening of the shock absorber 4.

The shock absorber 4 can, for example, be configured as a hydraulic or pneumatic shock absorber. Shock absorbers of this kind are known so that they do not have to be explained here in greater detail.

In addition to the air spring 2 and the shock absorber 4, the system includes an ancillary volume 22 which is mounted outside of the air volume 16 of the air spring 2 and of the shock absorber 4. The magnitude of the ancillary volume 22 is independent of the instantaneous spring position of the air spring and of the instantaneous position of the controllable shock absorber 4, that is, independent of the instantaneous position of the displacement piston 36.

The air spring 2 includes a resilient member 10 which is mounted in a manner known per se between a connecting part 12 and a roll-off piston 14 and encloses an air volume 16. The air volume 16 communicates with the ancillary volume 22 via a line 18, which is led through the connecting part 12, and via a throttle 20. The throttle 20 is controllable independently of the throttle openings 24 in the displacement piston 36. The ancillary volume 22 is further preferably rigidly configured, that is, its size is unchangeable.

Alternatively, it is possible to configure the ancillary volume 22 to be changeable with respect to its size. This can take place, for example, in that the ancillary volume 22 is subdivided into two chambers by a partition wall in which controllable throttles are mounted. The throttles can be especially completely closed and opened. The controllable throttle 20 can, for example, be so configured as disclosed in German patent publication 4,334,007 which is incorporated herein by reference.

The throttle adjustment of all throttles of the system is controllable by the control unit 26 independently of each other. In the embodiment, the throttle adjustment is the size of the throttle openings 24. This throttle adjustment and therefore the magnitude of the damping of the shock absorber 4 is controllable by the control unit 26 via a line 28. The throttle adjustment (that is, the size of the throttle openings 30) in the throttle 20 (that is, the throttle resistance of the throttle 20) is likewise controllable via a line 32 by the control unit 26. With the throttle 20, the air volume 16 of the air spring is connected to the ancillary volume 22. The spring stiffness of the air spring 10 is continuously adjustable via the throttle setting of the throttle 20. When the throttle openings 30 are completely closed, the air spring 10 exhibits the highest spring stiffness and when the throttle openings 30 are completely opened, the air spring exhibits the lowest spring stiffness. The air spring 10 can exhibit all spring stiffnesses which lie therebetween in dependence upon the adjusted size of the throttle openings 30.

The control of the throttle openings 24 of the shock absorber and the throttle openings 30 in the throttle 20 between the air spring 2 and the ancillary volume 22 takes place via the control unit 26 as follows. In the control unit 26, the desired spring stiffness of the spring strut is preset in the control unit 26 in dependence upon the driving situation of the motor vehicle and is adjusted with the throttle 20 of the ancillary volume 22 via the line 32.

Then, in the control unit 26, the desired total damping of the system is preset and comprises the air spring 2 with the ancillary volume 22 and the shock absorber 4. This damping is, in part, developed by the air spring 2 with the ancillary volume 22 and is determined in the control unit 26 as follows. First, the control unit (for example, based on the measurement signals from the acceleration sensors) determines in a manner known per se with which frequency the part of the motor vehicle (to which the air spring with the ancillary volume 22 is assigned) primarily oscillates instantaneously. Thereafter, the magnitude of the damping is determined in the control unit 26 which results between the air spring 2 and the ancillary volume 22 for the previously adjusted throttle setting of the throttle 20 and for the instantaneous frequency. This can, for example, take place by means of a characteristic line wherein the magnitude of the damping is plotted as a function of the frequency.

The residual damping which is still necessary and which is developed in the shock absorber 4 is determined by the control unit 26, the throttle 24 of the shock absorber 4 is then correspondingly adjusted via the line 28 so that the sum of the damping from the air spring 2 with the ancillary volume 22 and from the residual damping corresponds to the total damping and to the requirements of the vehicle.

For the control, known control algorithms for damping controls with which the throttle of an adjustable damper is controlled (and which operate, for example, in accordance with the skyhook principle) are expanded so that additionally, the drive of the adjustable throttle 20 of the ancillary volume 22 is included in the control algorithms. Here, the throttles 20 and 24 are adjusted corresponding to the requirements of the vehicle in the instantaneous driving state. Accordingly, a combined air spring/damping control is achieved.

Figure 2:
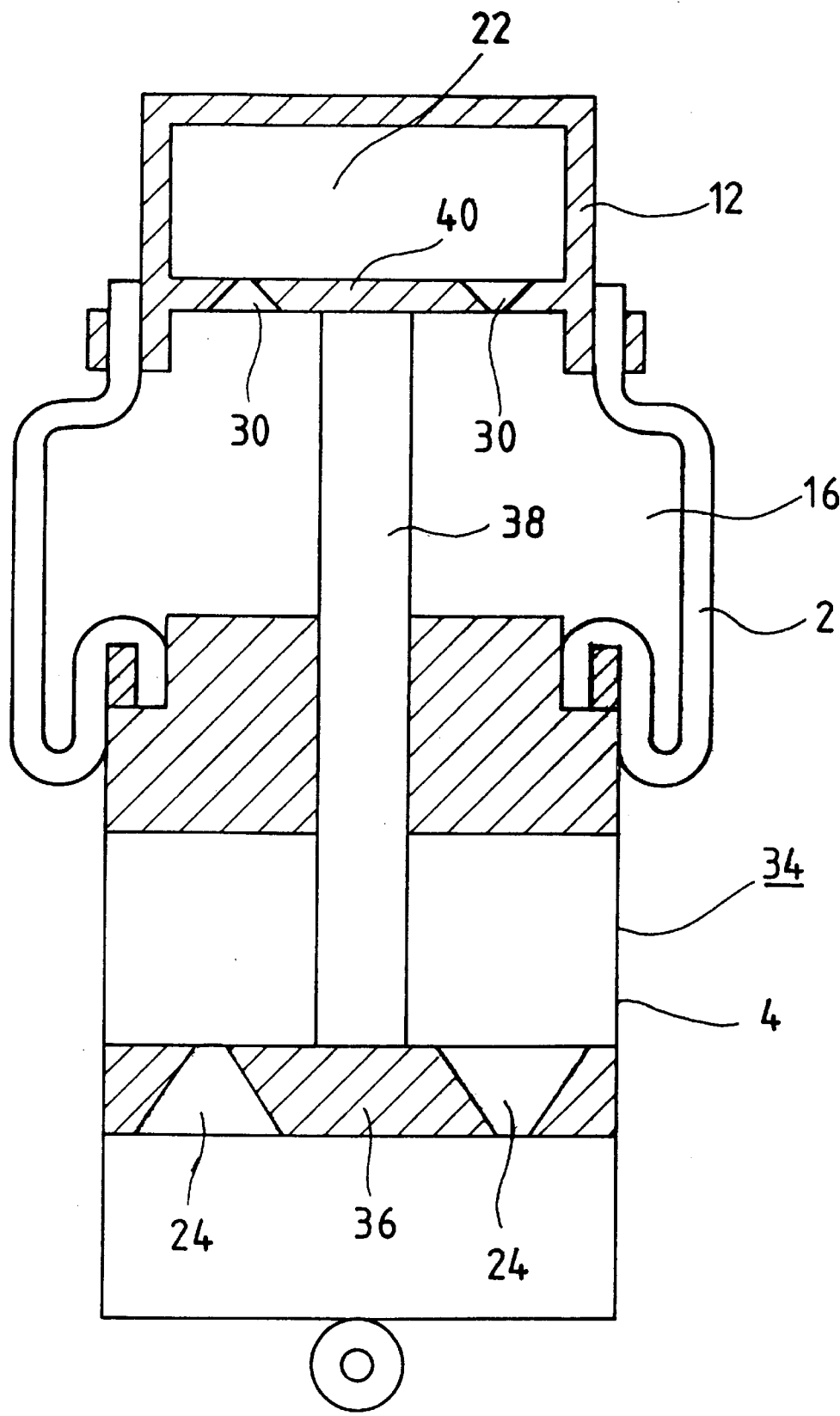

FIG. 2 shows a system wherein the air spring and the shock absorber 4 are mounted in a shock absorber spring unit 34. The air spring 2 is preferably mounted above the shock absorber 4 and the displacement piston 36 of the shock absorber 4 is connected via a piston rod 38 to the upper connecting part 12 of the air spring. When the air spring 2 compresses, the displacement piston 36 is correspondingly moved downwardly and, when the air spring 2 expands, the displacement piston 36 is correspondingly moved upwardly so that the air spring 2 is connected in parallel to the shock absorber 4. In the embodiment shown in FIG. 2, the ancillary volume 22 is mounted in the upper connecting part 12 and is configured so as to be unchangeable. A partition wall 40 is disposed between the air volume 16 of the air spring 2 and the ancillary volume 22. This partition wall 40 is part of the upper connecting part 12 and the controllable throttle openings 30 are located in this partition wall 40.

The sizes of the throttle openings 30 as well as the sizes of the throttle openings 24 can be controlled by the control unit 26 (see FIG. 1). This takes place in accordance with the method explained in connection with FIG. 1.

It is understood that the foregoing description is that of the preferred embodiments of the invention and that various changes and modifications may be made thereto without departing from the spirit and scope of the invention as defined in the appended claims.

What is claimed is:

1. A method for controlling a system for a motor vehicle, the system including an air spring enclosing an air volume and a controllable shock absorber connected in parallel to the air spring, the method comprising the steps of:

providing an ancillary volume connected to said air volume via a controllable throttle having a throttle resistance which can be varied;

presetting a total damping of said system and presetting a spring stiffness of said air spring independently of presetting said total damping;

adjusting said throttle resistance so that said air spring has said preset stiffness;

determining the magnitude of a damping which occurs at said controllable throttle in dependence upon frequency; and, adjusting said controllable shock absorber so that the sum of the damping occurring therein and the damping occurring at said controllable throttle corresponds substantially to said total damping.

2. The method of claim 1, wherein said ancillary volume is separate from said enclosed air volume and said ancillary volume is unchangeable.

3. The method of claim 1, wherein said air spring and said shock absorber are each individually mounted separate from each other.

4. The method of claim 1, comprising the further step of providing a shock absorber spring unit and mounting said shock absorber and said air spring in said shock absorber spring unit.

5. The method of claim 1, comprising the further step of providing a line connecting said enclosed air volume to said ancillary volume.

6. The method of claim 1, comprising the further step of connecting said enclosed air volume directly to said ancillary volume.

* * * * *